No. 613,297. Patented Nov. 1, 1898.
M. PALMTAG.
RUNNER FOR VEHICLES.
(Application filed Dec. 22, 1897.)
(No Model.) 2 Sheets—Sheet 1.

Fig. I.

Witnesses:
Fenton S. Belt,
J. Purday.

Inventor:
M. Palmtag,
by H. B. Willson & Co.
Attorneys

No. 613,297.

M. PALMTAG.
RUNNER FOR VEHICLES.
(Application filed Dec. 22, 1897.)

Patented Nov. 1, 1898.

(No Model.)

2 Sheets—Sheet 2.

Witnesses:

Inventor:
M. Palmtag,
by H. B. Willson & Co.
Attorneys.

UNITED STATES PATENT OFFICE.

MARTIN PALMTAG, OF NEW WHATCOM, WASHINGTON.

RUNNER FOR VEHICLES.

SPECIFICATION forming part of Letters Patent No. 613,297, dated November 1, 1898.

Application filed December 22, 1897. Serial No. 662,972. (No model.)

*To all whom it may concern:*

Be it known that I, MARTIN PALMTAG, a citizen of the United States, residing at New Whatcom, in the county of Whatcom and State of Washington, have invented certain new and useful Improvements in Runners for Vehicles, &c.; and I do declare the following to be a full, clear, and exact description of the invention, such as will enable others skilled in the art to which it appertains to make and use the same.

My invention has relation to traction-machines driven by steam, electricity, created or carried by the vehicle or supplied to it through suitable connection and contact with live electric wires, or any other prime mover carried by the vehicle or supplied to it through contact or otherwise with any mechanical power whatever.

The object of the invention is to provide a runner or traction gear of sufficient width to allow the vehicle to pass over any kind of ground, swamp, snow, &c., with ease by increasing the traction-surface to create a track that will always lie stationary, thereby avoiding all tendency to slip and dig into the ground or snow, as is the case with the ordinary kinds of traction machinery.

The ordinary traction-wheel derives its power from adhesion to the ground. The object aimed at in this invention is the creation of resistance to the propelling or driving power in the machine itself independent of the resistance of the ground or surface upon which it travels.

In an application filed simultaneously herewith I have shown runners for vehicles and machinery of a similar character, but wherein the power for propelling the vehicle is derived from a source entirely independent of the machine or vehicle, such as horses or other animal power. In this application the power for driving it and the machinery for utilizing mechanical power are carried by the vehicle itself.

Figure 1:
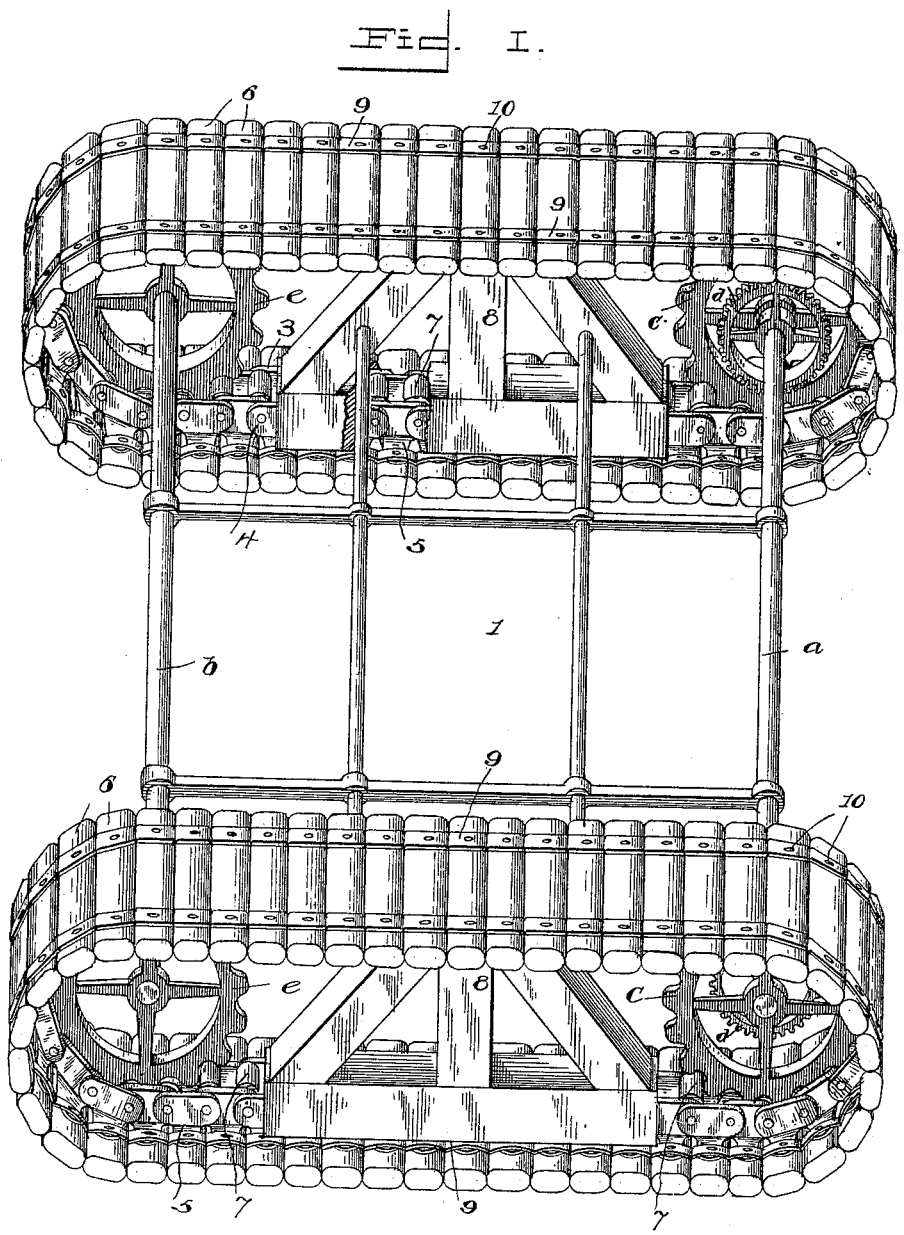
Figure 2:
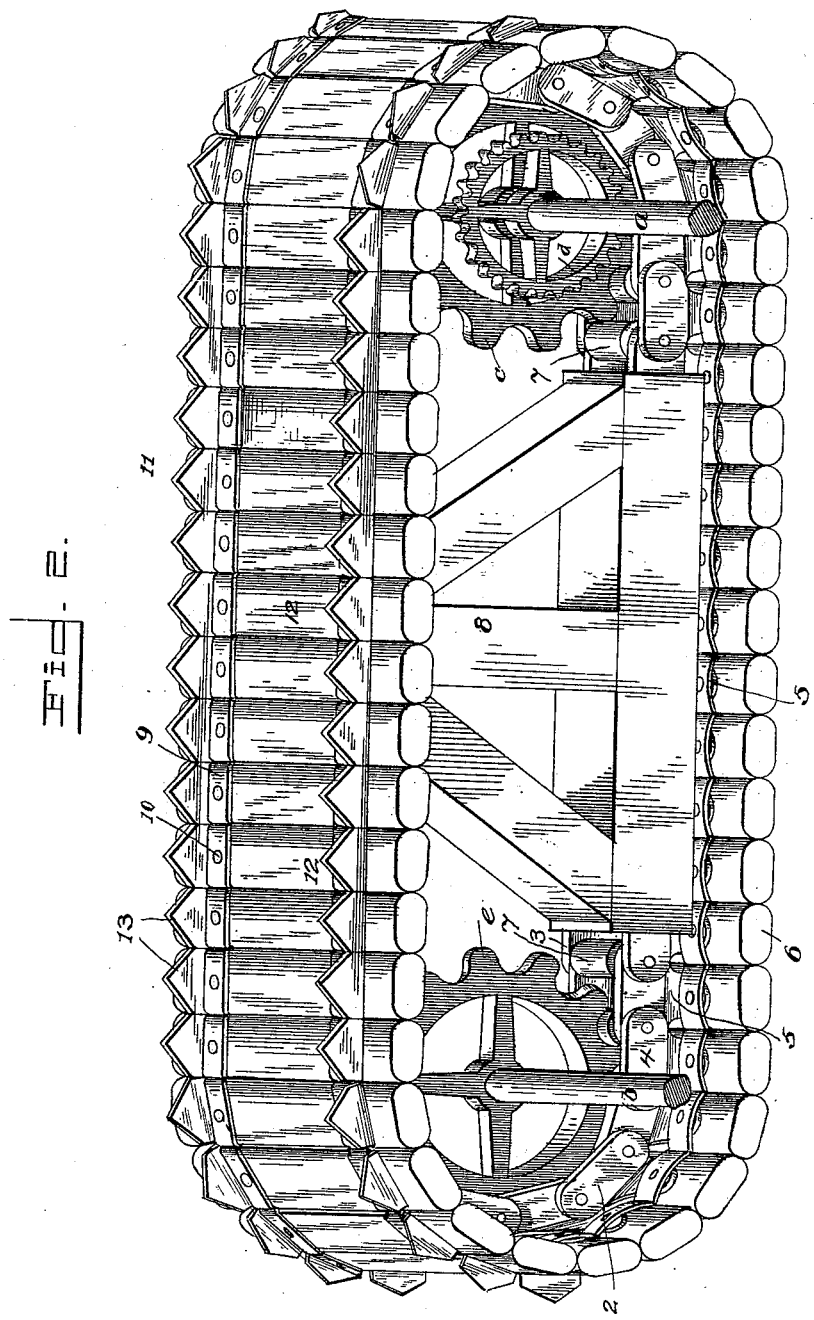

In the accompanying drawings, Figure 1 is a perspective view of my improved runners coupled together, the frame of the vehicle not being shown, as it forms no part of my invention and may be used with the frame of an agricultural machine, engine, sleigh, or ordinary carriage; and Fig. 2 is an enlarged perspective view of one of the runners with means for applying the power thereto.

In said drawings, 1 denotes the frame of a vehicle having transverse shafts $a$ and $b$, the former of which is provided with sprocket-wheels $c$ and gear-wheels $d$, and the latter of which is provided simply with sprocket-wheels $e$ corresponding to those of the shaft $a$.

2 denotes an endless track which consists of parallel chains 3 and 4, each of which is provided with ears 5, that are bolted to the traction-bars 6. The pivots of the links of one chain connect the links of the other chain and afford journals for rollers 7, that are located between said chains.

8 denotes supports that are located between the runs of each runner and are normally out of engagement with the rollers carried by said runners. When running on level surfaces, the runners will remain flat; but on uneven surfaces a slight rise in the ground will push the runner upward, and the rollers will be brought against the support and revolve freely on the lower surface thereof, thereby reducing friction to a minimum and dividing the weight of the vehicle between its frame and the rollers carried in the chain, thereby removing any undue strain from the chain and shafts, at the same time providing for the necessary adhesion for traction.

In order to prevent the traction-bars, which are preferably made of wood, from splitting, I shrink metallic bands 9 around the ends thereof. These bands also extend around the lugs of the chain-links, and a bolt 10 is passed through the lug, bands, and bars and prevents the bands from slipping off.

When the device is used for traveling over snow or ice, I provide the bars with claws 11, which consist of a bar clamped to the traction-bars by the clamps and bolts aforesaid and provided with prongs 13. Power being applied to the shaft $a$, it is evident that the track will be carried by the front sprocket-wheels engaging the rollers of the chain, thereby laying the track on the ground, while the weight of the machine is causing it to lie stationary while the rear wheels pass over it and pick it up from behind again, the vehicle being thus driven or propelled forward.

Any suitable power may be applied to the shafts, such as steam, electricity, or hand or foot power.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. Runners for the purpose described, comprising transverse shafts provided with sprocket-wheels, tracks consisting of chains carrying traction-bars, and rollers, said rollers being engaged by sprocket-wheels, substantially as set forth.

2. Runners for the purpose described, comprising transverse shafts provided with suitable gearing for receiving the power and transmitting it to said shafts, sprocket-wheels connected to said shafts, tracks consisting of chains carrying traction-bars, and rollers, said rollers being engaged by sprocket-wheels, substantially as set forth.

3. Runners for the purpose described, comprising transverse shafts provided with suitable gearing for receiving and transmitting the power, sprocket-wheels connected to said shafts, tracks consisting of chains carrying traction-bars, and rollers, said rollers being engaged by sprocket-wheels, a brace being located between the runs of the track and within touching distance of the rollers in the chains, substantially as set forth.

4. Runners for the purpose described, consisting of chains arranged side by side, and provided with lugs, pivot-bolts connecting the links of the chains, rollers carried by the pivot-bars, traction-bars secured to the said lugs, and metallic bands shrunk around said traction-bars and lugs, substantially as set forth.

5. Runners for the purpose described, comprising transverse shafts, provided with suitable gearing for receiving and transmitting the power, sprocket-wheels connected to said shafts, tracks consisting of chains arranged side by side and provided with lugs, pivot-bolts connecting the links of the chains, rollers carried by said pivot-bolts, said rollers engaging said sprocket-wheels, a brace or support being located between the runs of the tracks and within touching distance of the rollers in the chains, traction-bars secured to said lugs, ice-claws carried by said bars, metallic bands shrunk around the claws, bars and lugs, and bolts passed through the bands, claws, bars and lugs, substantially as set forth.

6. The combination with the frame of a vehicle, shafts journaled in said frame, carrying suitable gearing for receiving and transmitting the power, sprocket-wheels connected to said shafts, tracks consisting of chains arranged side by side and provided with lugs, pivot-bolts connecting the links of the chains, rollers carried by said pivot-bolts, said rollers engaging sprocket-wheels, a brace or support being located between the runs of the track, and within touching distance of the rollers in the chains, traction-bars secured to said lugs, ice-claws carried by said bars, metallic bands shrunk around the claws, bars and lugs, and bolts passed through the bands, bars and lugs, substantially as set forth.

7. The combination of motive power carried by a vehicle or supplied to its machinery by contact or any other mechanical means, with shafts journaled in the frame of said vehicle, carrying suitable gearing for receiving and transmitting the power to sprocket-wheels connected to said shafts, tracks consisting of chains arranged side by side and provided with lugs, pivot-bolts connecting the links of the chains, rollers carried by said pivot-bolts, said rollers engaging said sprocket-wheels, a brace or support being located between the runs of the tracks within touching distance of the rollers in the chain, traction-bars secured to said lugs, ice-claws carried by said bars, metallic bands shrunk around the claws, bars and lugs, and bolts passed through the bands, claws, bars and lugs, substantially as set forth.

In testimony whereof I hereunto affix my signature in presence of two witnesses.

MARTIN PALMTAG.

Witnesses:
ELLIOTT STEWART,
A. T. FAZON.